J. E. LEONARD.
ADJUSTABLE CURTAIN FOR CAMERAS.
APPLICATION FILED NOV. 7, 1919.

1,390,246.

Patented Sept. 6, 1921.
4 SHEETS—SHEET 1.

INVENTOR.
JOHN E. LEONARD.
BY
ATTORNEYS.

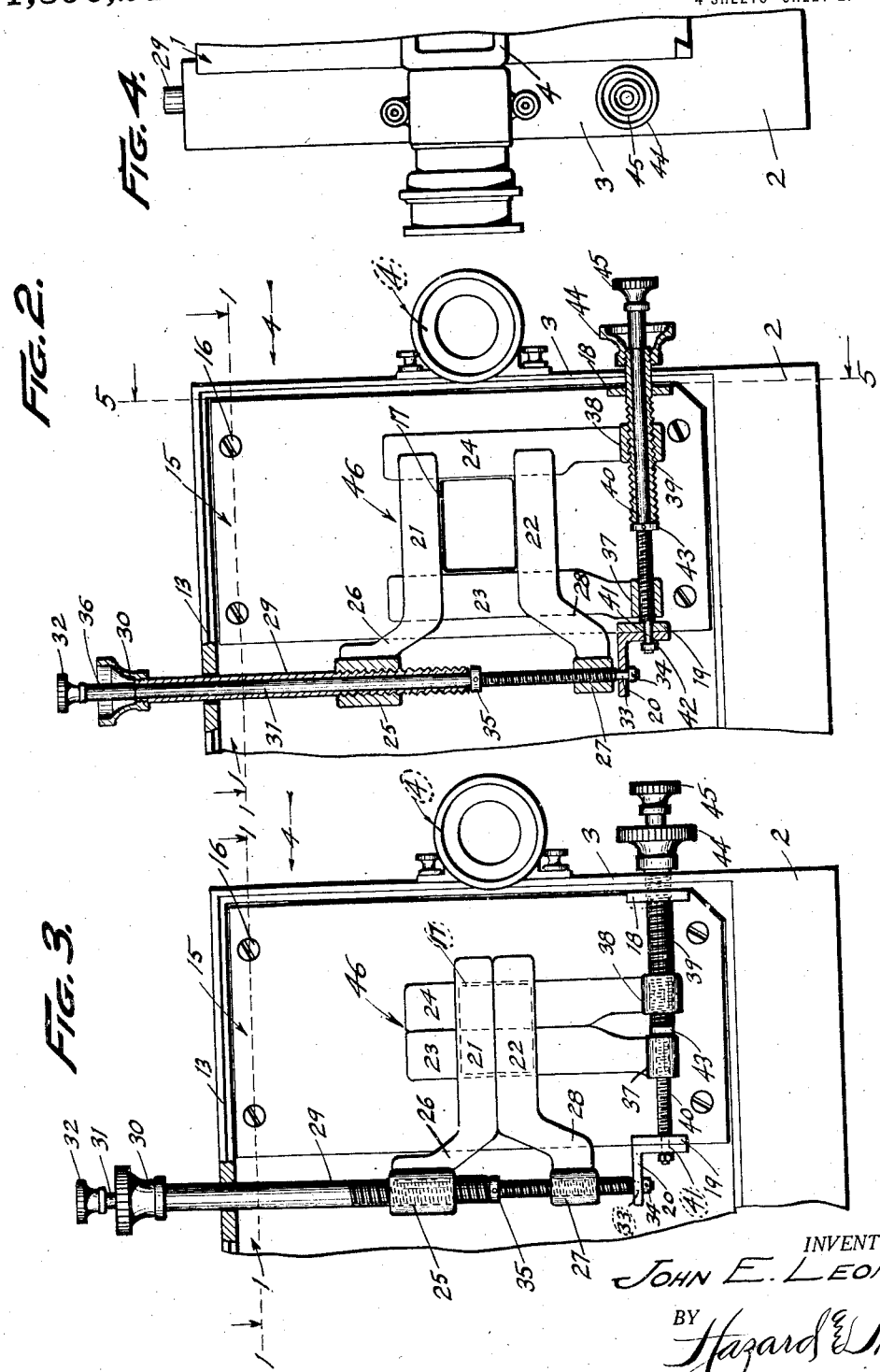

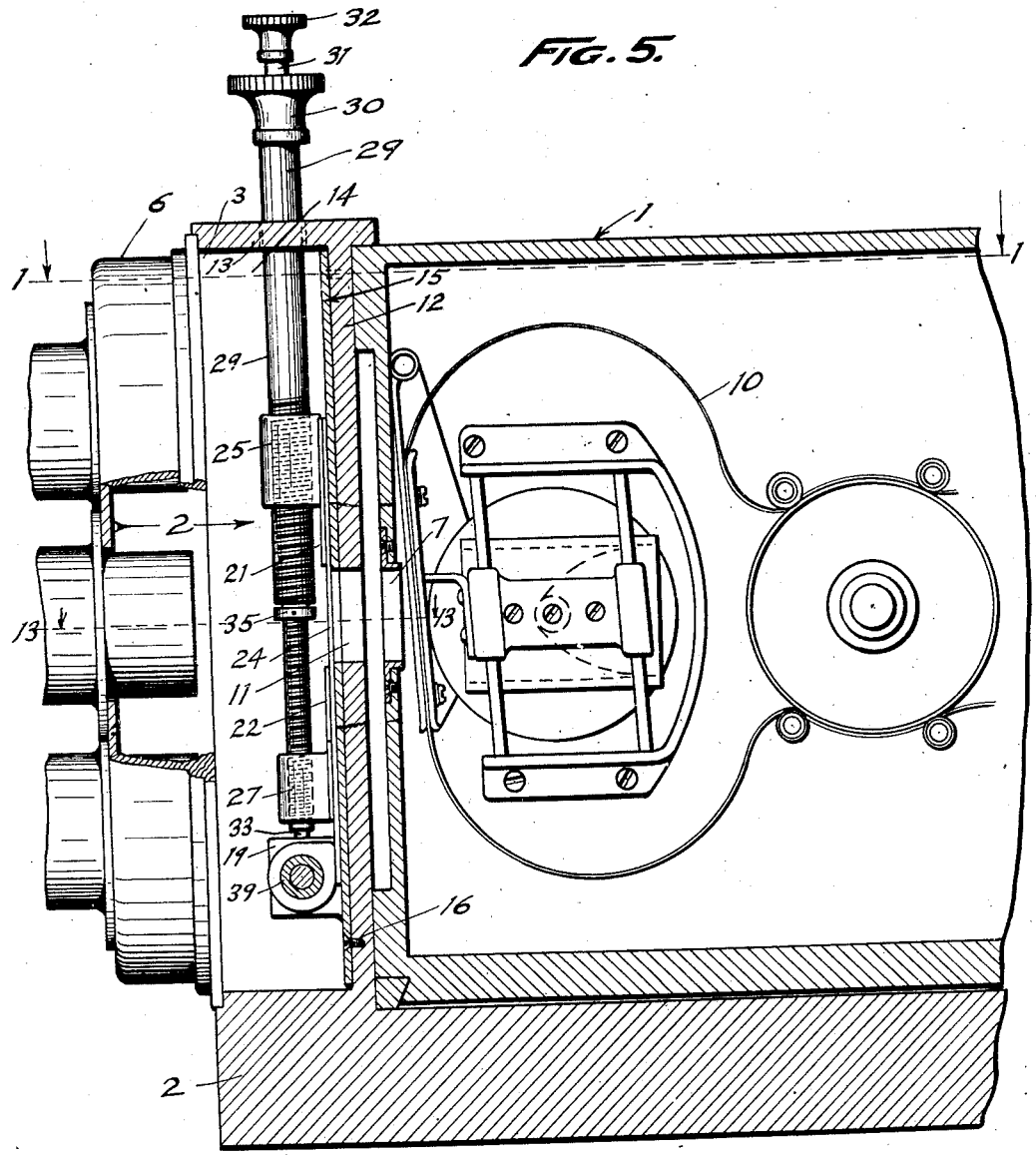

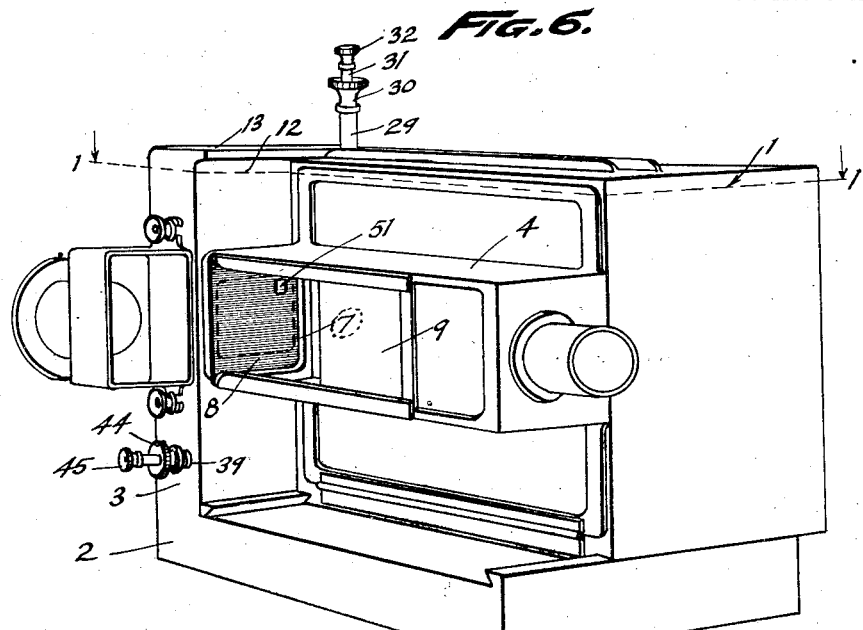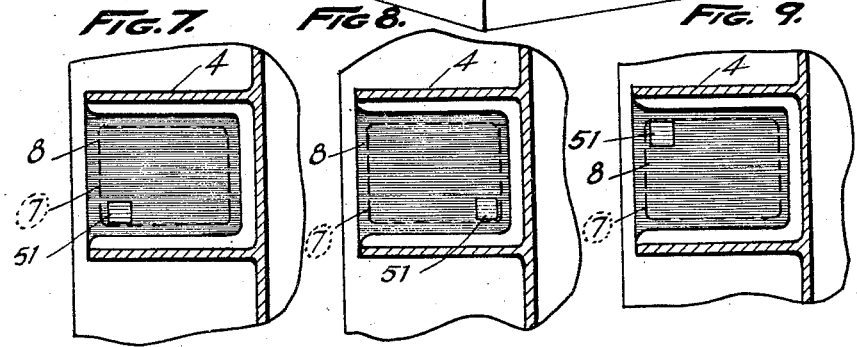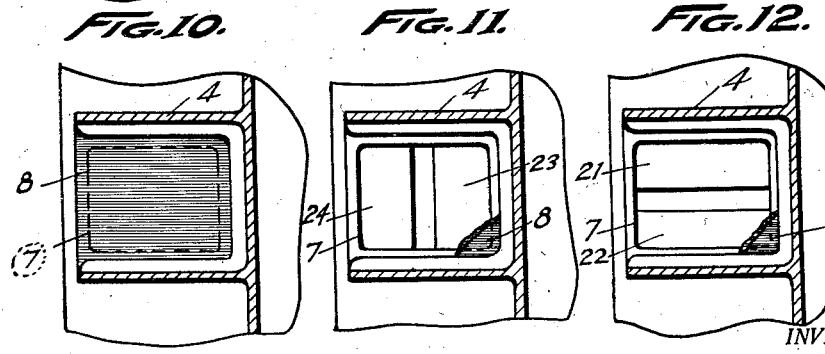

UNITED STATES PATENT OFFICE.

JOHN E. LEONARD, OF LOS ANGELES, CALIFORNIA, ASSIGNOR, BY MESNE ASSIGNMENTS, TO MITCHELL CAMERA CO., A CORPORATION.

ADJUSTABLE CURTAIN FOR CAMERAS.

1,390,246.  Specification of Letters Patent.  Patented Sept. 6, 1921.

Application filed November 7, 1919. Serial No. 336,394.

*To all whom it may concern:*

Be it known that I, JOHN E. LEONARD, a citizen of the United States, residing at Los Angeles, in the county of Los Angeles and State of California, have invented new and useful Improvements in Adjustable Curtains for Cameras, of which the following is a specification.

My invention relates to moving picture cameras and consists of the novel features herein shown, described and claimed.

The principal object of my invention is to make and mount an adjustable curtain structure between the lens and the exposure aperture of a motion picture camera.

Fig. 2 is a fragmentary front elevation showing the adjustable curtain structure with the lens magazine removed from in front thereof, the view being taken looking in the direction indicated by the arrows 2 in Figs. 1 and 5, parts being shown in section and the curtain structure being adjusted to fit the exposure aperture.

Fig. 3 is a view analogous to Fig. 2 with the curtain structure adjusted to a different position.

Fig. 4 is a fragmentary side elevation looking in the direction indicated by the arrow 4 in Figs. 2 and 3.

Fig. 5 is a vertical longitudinal sectional detail on the lines 5—5 of Figs. 1 and 2.

Fig. 6 is a perspective of the camera having a transversely movable camera box and a finder and showing the camera box moved to bring the finder into line with the exposure aperture and showing the finder open and a ground glass screen behind the exposure aperture to indicate the position of the curtain members.

Figs. 7, 8 and 9 are cross sections behind the ground glass screen and showing the result of different positions of the curtain members.

Fig. 10 shows the curtain structure wide open.

Fig. 11 shows the side curtain members adjusted and the top and bottom curtain members wide open.

Fig. 12 shows the top and bottom curtain members adjusted and the side curtain members wide open.

Figure 1:
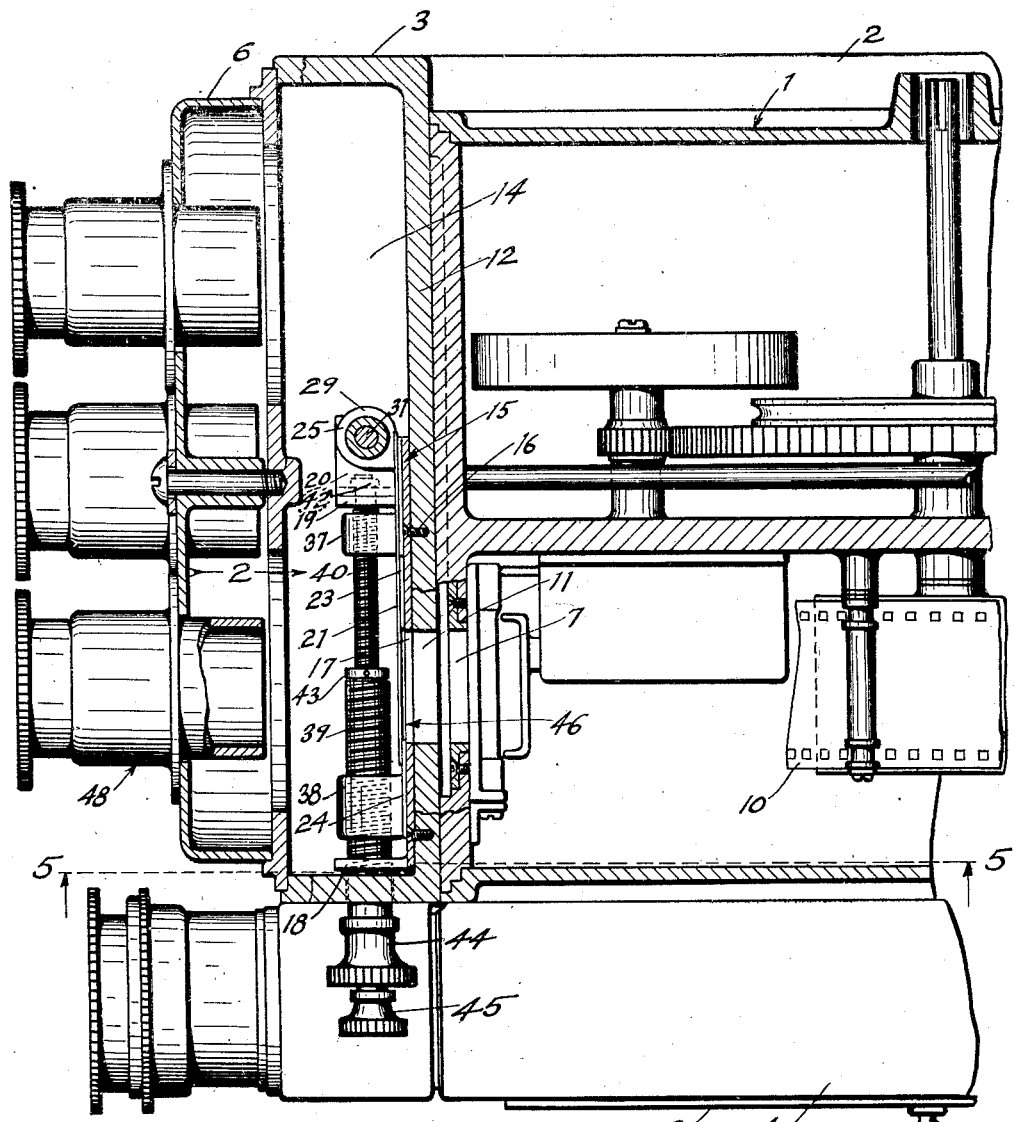
Figure 1 is a fragmentary horizontal section on the lines 1—1 of Figs. 2, 3 and 5.

Referring to Figs. 1, 5 and 6 the camera box 1 is mounted to slide transversely upon the base 2. The casing 3 is formed rigid with the base 2 and extends upwardly in front of the camera box 1. The movable portion 4 of the finder is built integral with the camera box 1 and the lens portion 5 of the finder is built upon the casing 3. The photographing lens magazine 6 is mounted upon the front face of the casing 3. When the camera box 1 is moved laterally upon the base 2 the portion 4 of the finder is brought into registration with the exposure aperture 7 and with the photographing lens operating in line with the exposure aperture.

The ground glass screen 8 is mounted in front of the finder 4 to fit behind the exposure aperture 7. A sliding door 9 is formed in the outer side of the finder, so that the door may be opened and the screen 8 viewed from the back side to assist in adjusting the curtain forming elements and to see the result upon the screen 8.

When the camera box 1 is in photographing position, as in Fig. 1, the film 10 is behind the exposure aperture 7 and the exposure aperture 7 is in line with the aperture 11 through the rear wall 12 of the casing 3. A flange 13 extends forwardly from the edges of the rear wall 12 all the way around thus producing the chamber 14 in front of the wall 12 and back of the photographing lens.

Referring to Figs. 1 to 5, the curtain structure mounting 15 is a flat plate fitting against the front face of the rear wall 12 and secured in place by screws 16 inserted through the plate 15 and tapped into the wall 12. An aperture 17 is formed through the plate 15 in line with the apertures 11 and 7. A bearing bracket 18 extends forwardly from the lower outside corner of the plate 15. A similar bearing bracket 19 extends forwardly from the opposite corner, said brackets 18 and 19 being in horizontal alinement. A bearing bracket 20 is formed by securing an angle plate against the side of the bearing bracket 19. The bearing in the bracket 20 is vertical.

The curtain members 21, 22, 23 and 24 are thin plates. The plates 23 and 24 fit closely against the front face of the mounting 15 and the plates 21 and 22 fit closely against the front faces of the plates 23 and 24. An internally screw-threaded bearing 25 is secured to the arm 26 extending from the outer end of the plate 21 so as to offset the bearing 25 upwardly relative to the body of the plate. In a like manner an internally screw-threaded bearing 27 is rigidly connected to the arm 28 extending outwardly and downwardly from the plate 22 so as to offset the bearing 27 relative to the body of the plate. An adjusting screw 29 is screw-seated through the bearing 25 and extends outwardly through the flange 13 and has a handwheel 30 upon its outer end. The screw 29 is tubular.

A second adjusting screw 31 is mounted loosely through the screw 29 and is screw-seated through the bearing 27, there being a second handwheel 32 outside of the handwheel 30 for operating the screw 31. The screw 31 has a pintle 33 extending through the bearing 20 and a stop 34 upon the lower end of the pintle, so that the screw is swiveled in the bearing 20 to rotate freely and held against endwise movement.

A stop collar 35 is fixed upon the screw 31 substantially in line with the horizontal center of the exposure aperture 7 and the screw 29 works against this stop collar 35. The hub 36 of the handwheel 32 engages the hub of the handwheel 30 to hold the screw 29 from moving upwardly on the screw 31. Manipulating the handwheels 30 and 32 will move the curtain members 21 and 22 to or from each other to the extent that the curtain members 21 and 22 may be moved together to cover the exposure aperture 7 and move the part to any desired extent to uncover the exposure aperture.

Screw-threaded bearings 37 and 38 are made rigid with the curtain members 23 and 24. A third adjusting screw 39 is mounted loosely through the flange 13 and loosely through the bearing 18 and screw-seated through the bearing 38. The screw 39 is tubular. The fourth adjusting screw 40 is mounted loosely through the screw 39 and screw-seated through the bearing 37. The screw 40 has a pintle 41 fitting rotatably in the bearing 19 and a stop 42 on the outer end of the pintle against the bearing 19 so as to hold the screw 40 from endwise movement.

A stop 43 is fixed upon the screw 40 substantially in vertical alinement with the plane of the center of the exposure aperture 7. The screw 40 works against the stop 43.

A handwheel 44 is fixed upon the outer end of the screw 39. A handwheel 45 is fixed upon the outer end of the screw 40. The handwheel 45 engages the handwheel 44 to hold the screw 39 from moving endwise on the screw 40. The handwheels 44 and 45 are outside of the casing 3 and manipulation of the handwheels 44 and 45 will move the curtain members 23 and 24 to and from each other to any extent so as to cover and uncover the exposure aperture 7.

In Fig. 3 the curtain structure 46 thus produced is closed so as to completely cover the exposure aperture 7 by bringing the plates 21 and 22 together one way and the plates 23 and 24 together the other way. In Fig. 2 the curtain structure is wide open so as not to obstruct or interfere with the exposure aperture 7.

In Figs. 1 and 5 it is shown that the curtain members 23 and 24 fit tight against the face of the mounting 15, and that the curtain members 21 and 22 fit tight against the faces of the members 23 and 24, and that the bearings 37 and 38 are offset forwardly from the curtain members 23 and 24, and that the bearings 25 and 27 are offset forwardly from the curtain members 21 and 22, and that the curtain structure 46 thus produced is as near as may be to the exposure aperture 7 and between the exposure aperture 7 and the photographing lens.

Figure 13:
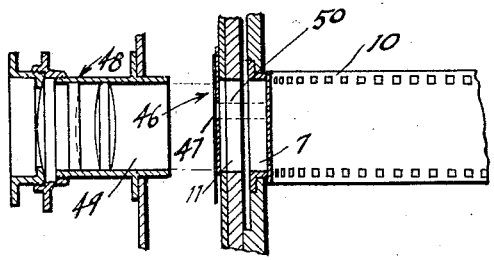
Fig. 13 is a fragmentary horizontal sectional detail on the line 13—13 of Fig. 5.

Referring to Fig. 13, the opening 47 through the curtain structure 46 is in front of the exposed film 10 and back of the photographing lens construction 48, and the light 49 passes through the photographing lens construction 48 strikes the curtain structure 46 and is entirely obstructed with the exception of the shaft of light 50 which passes through the opening 47. By manipulating the handwheels 30, 32, 44 and 45 the shaft of light 50 may be enlarged or reduced and may be moved and directed to any point upon the film 10 within the range of the exposure aperture 7.

Referring to Figs. 6, 7, 8, 9, 10, 11 and 12, the shaft of light 50 produces a spot 51 upon the ground glass screen 8, and by viewing this spot through the finder opening and manipulating the handwheels 30, 32, 44 and 45 the spot 51 may be made larger or smaller. The form of the spot may be changed and the spot may be moved to any point within the exposure aperture 17.

In Fig. 6 the spot 51 is substantially square and at the upper right-hand corner of the exposure aperture. After the spot has been located to suit the operator, the camera box 1 is moved to bring the film moving mechanism into registration with the exposure aperture 7, and the photographing lens will register upon the film only that part of the scene which occupies the place of the spot 51.

By manipulating the handwheels to manipulate the curtain structure while the photographing operation is going on the scene may be faded in or faded out as desired.

In Figs. 7, 8 and 9 the spot 51 is shown in three positions differing from the position shown in Fig. 6.

In Fig. 10 the curtain structure is wide open so as not to obstruct the exposure aperture.

In Fig. 11 the side curtain members 23 and 24 have been adjusted to make a vertically elongated central spot 51 and the upper and lower curtain members 21 and 22 have been moved out of range. Of course, this vertically elongated spot may be moved laterally as desired.

In Fig. 12 the operation has been reversed. The side curtain members 23 and 24 have been moved out of range and the upper and lower curtain members 21 and 22 have been manipulated to produce a horizontally elongated spot 51. Of course, this spot 51 may be shortened by bringing the side curtain members 23 and 24 into view.

Various changes may be made without departing from the spirit of my invention as claimed.

I claim:

1. A camera having a curtain structure between the photographing lens and the exposure aperture and which structure includes pairs of adjustable curtain members, one pair of which is disposed substantially at right angles to the other pair.

2. A camera having a curtain structure between the photographing lens and the exposure aperture, which curtain structure includes pairs of independently adjustable curtain members, and means for raising and lowering certain of said curtain members to shift the aperture formed between said members.

3. A camera having a curtain structure formed of independently adjustable pairs of plates between the photographing lens and the exposure aperture, and means for moving the curtain members to shift certain of said plates laterally to shift the aperture formed between said plates.

4. The combination, with a camera having a lens and an exposure aperture, of a curtain structure arranged between said lens and aperture and comprising pairs of curtain members, each pair being independently adjustable with respect to the other pair, and the members of each pair of said members being independently adjustable.

5. A camera having curtain members arranged in pairs between the photographing lens and the exposure aperture, and screw means for adjusting said curtain members to vary the dimensions of the aperture formed between said members.

6. A camera having curtain members disposed between the photographing lens and the exposure aperture and inside of the camera case, and means operable from outside of the camera case for moving the curtain members to cause the aperture formed between said members to register at any desired point in the exposure aperture of the camera.

7. A camera having curtain members disposed between the photographic lens and the exposure aperture and inside of the camera case, and means operable from outside of the camera case for adjusting the curtain members to vary the dimensions of the aperture formed between them.

8. A camera having a curtain structure between the photographing lens and the exposure aperture which structure includes curtain members, and screw means for raising and lowering certain of said curtain members to shift the aperture formed between said members.

9. A camera having a curtain structure interposed between the photographing lens and the exposure aperture and inside of the camera case which structure includes adjustable curtain members, and screw means operable from outside of the camera case for moving said curtain members to cause the aperture formed between them to register at any desired point in the exposure aperture of the camera.

10. A camera having a curtain structure positioned between the photographing lens and the exposure aperture and within the camera case which structure includes independently movable curtain members, and screw means operable from outside of the camera case for adjusting the positions of the curtain members to vary the dimensions of the aperture formed between them.

11. A camera having a curtain structure between the photographing lens and the exposure aperture, which curtain structure is disposed within the camera case and includes adjustable curtain members, means operable from the exterior of the camera case for moving the curtain members to cause the aperture between said members to register at any desired point in the exposure aperture of the camera and a part of which curtain member moving means is operable for adjusting the size of the aperture formed between said members.

12. A camera having a base, a casing extending upwardly from one side of the base and having a photographing lens and an exposure aperture, a camera box mounted upon the base to move into and out of registration with the exposure aperture, a finder box mounted upon the camera box to move into registration with the exposure aperture when the camera box moves out of registration and vice versa, a curtain structure mounted in the casing between the photographing lens and the exposure aperture which curtain structure includes adjustably mounted curtain members and means operable from outside of the casing for adjusting the curtain members to cause the aperture formed between them to register at any desired point in the exposure aperture of the camera.

13. A camera having a base, a casing extending upwardly from one side of the base and having a photographing lens and an exposure aperture, a camera box mounted upon the base to move into and out of registration with the exposure aperture, a finder box mounted upon the camera box to move into registration with the exposure aperture when the camera box moves out of registration and vice versa, a curtain structure mounted in the casing between the photographing lens and the exposure aperture which curtain structure includes adjustable curtain members and means operable from outside of the casing for adjusting the curtain members to vary the size of the aperture formed between said members.

14. A camera having a base, a casing extending upwardly from one side of the base and having a photographing lens and an exposure aperture, a camera box mounted upon the base to move into and out of registration with the exposure aperture, a finder box mounted upon the camera box to move into registration with the exposure aperture when the camera box moves out of registration and vice versa, a curtain structure mounted in the casing between the photographing lens and the exposure aperture which curtain structure includes adjustably mounted curtain members, means operable from the exterior of the camera box for adjusting the curtain members to cause the aperture between them to register at any desired point in the exposure aperture of the camera and a part of which curtain member adjusting means is operable to adjust the size of the exposure aperture between said members.

15. A camera having a transverse face within the casing and in a plane in front of the exposure aperture and behind the photographing lens, a curtain structure mounting secured against the face, bearings supported by the curtain structure mounting, two curtain members mounted to move to and from each other in a horizontal plane, screws supported by the bearings and extending through the casing for operating the horizontally moving curtain members, two curtain members mounted to move to and from each other in a vertical plane, and screws mounted in the bearings and extending through the casing and adapted to operate said vertically moving curtain forming members.

16. A camera having a transverse face within the casing and in a plane in front of the exposure aperture and behind the photographing lens, a curtain structure mounting secured against the face, a vertical bearing rigid with the curtain mounting, a screw mounted in the vertical bearing for rotation and held against endwise movement and extending through the casing, a second screw through which the first screw extends, the second screw extending through the casing and held against endwise movement, bearings upon the first and second screws, curtain members carried by the bearings to move to and from each other vertically by the operation of the screws, horizontal bearings extending from the mounting, a third screw mounted through the horizontal bearings for rotation and held against endwise movement and extending through the casing, a fourth screw mounted upon the third screw and extending through the casing and held against endwise movement, bearings upon the third and fourth screws, and second curtain members carried by the bearings to move to and from each other by the operation of the screws, the second curtain members being crosswise of the first curtain members, and said curtain members being adapted to form a curtain aperture in line with the photographing lens and exposure aperture so that the curtain aperture may be enlarged or reduced and moved to register with any desired point within the exposure aperture of the camera.

17. A camera having a curtain structure between the photographing lens and the exposure aperture and surrounded by a casing which structure includes movable curtain members, and screw means operable from outside of the casing for controlling the curtain members to move them horizontally and vertically.

18. The combination, with a camera having a lens and an exposure aperture, of a curtain structure arranged between said lens and said aperture, which curtain structure comprises independently adjustable curtain members arranged in pairs.

19. The combination, with a camera having a lens and an exposure aperture, of a curtain structure arranged between said lens and said aperture, which curtain structure comprises independently adjustable curtain members arranged in pairs and each pair of said members being independently adjustable.

20. The combination, with a camera having an exposure aperture, of a curtain structure located adjacent to said exposure aperture and comprising pairs of curtain members, the members of each pair being movable toward and away from each other and screw rods upon which said curtain members are mounted.

In testimony whereof I have signed my name to this specification.

JOHN E. LEONARD.